United States Patent [19]
Sowter

[11] 4,203,054
[45] May 13, 1980

[54] CORRECTION FACTOR SIGNALS FOR CATHODE RAY TUBES

[75] Inventor: Brian R. Sowter, Winchester, England

[73] Assignee: International Business Machines Corporation, Armonk, N.Y.

[21] Appl. No.: 940,695

[22] Filed: Sep. 8, 1978

[30] Foreign Application Priority Data

Sep. 15, 1977 [GB] United Kingdom ............ 38584/77

[51] Int. Cl.² .................. H01J 29/70; H01J 29/76
[52] U.S. Cl. .................................. 315/368; 315/13 C
[58] Field of Search ............ 315/13 C, 368, 370, 315/371, 367

[56] References Cited

U.S. PATENT DOCUMENTS

| | | | |
|---|---|---|---|
| 4,095,137 | 6/1978 | Oswald | 315/367 |
| 4,099,092 | 7/1978 | Bristow | 315/367 |
| 4,104,566 | 8/1978 | Shah | 315/367 |

*Primary Examiner*—Theodore M. Blum
*Attorney, Agent, or Firm*—Frederick D. Poag

[57] ABSTRACT

A method of convergence correction in a three beam color cathode ray tube dividing the screen into a plurality of discrete areas. Digital values for convergence factor signals are derived for a predetermined number of the discrete areas and a spreading algorithm is used to derive digital values for the remaining areas. The resulting digital values are stored in a digital store and used to provide convergence correction factor signals during operation of the tube.

14 Claims, 13 Drawing Figures

|     | ST | ACC 1 | ACC 2 | MATRIX |
|-----|----|----|----|----|
| START | 1 . 0 0<br>. 7 3<br>. 5 1<br>. 3 3<br>. 1 8<br>. 0 8<br>. 0 2<br>. 0 0 | 0 . 0<br>0 . 0<br>0 . 0<br>0 . 0<br>0 . 0<br>0 . 0<br>0 . 0<br>0 . 0 | 0<br>0<br>0<br>0<br>0<br>0<br>0<br>0 | 5 5 ─ ─ 5 5<br>5 5    5 5<br>5 5    5 5<br>5 5    5 5<br>5 5    5 5<br>5 5    5 5<br>5 5    5 5<br>5 5 ─ ─ 5 5 |

(a)

END 1ST. CYCLE

ST: 1 . 0 0 / . 7 3 / . 5 1 / . 3 3 / . 1 8 / . 0 8 / . 0 2 / . 0 0

ACC 2: 1 / 1 / 1 / 0 / 0 / 0 / 0 / 0

MATRIX: 6 6 ... 6 6 / 6 6 ... 6 6 / 6 6 ... 6 6 / 5 5 ... 5 5 / 5 5 ... 5 5 / 5 5 ... 5 5 / 5 5 ... 5 5 / 5 5 ... 5 5

(b)

STEP 33 2ND. CYCLE

ACC 1: 2 . 0 0 / 1 . 4 6 / 1 . 0 2 / . 6 6 / . 3 6 / . 1 6 / . 0 4 / . 0 0

ACC 2: 0 / 0 / 0 / 0 / 0 / 0 / 0 / 0

MATRIX: 5 5 ... 5 5 (×8 rows)

(c)

END 7TH. CYCLE

ACC 1: 7 . 0 0 / 5 . 1 1 / 3 . 5 7 / 2 . 3 1 / 1 . 2 6 / . 5 6 / . 1 4 / . 0 0

ACC 2: 7 / 5 / 4 / 2 / 1 / 1 / 0 / 0

MATRIX: 12 12 ... 12 12 / 10 10 ... 10 10 / 9 9 ... 9 9 / 7 7 ... 7 7 / 6 6 ... 6 6 / 6 6 ... 6 6 / 5 5 ... 5 5 / 5 5 ... 5 5

|  | DISTANCE FROM CENTRE $\frac{r}{R}$ | PARABOLIC SPREAD $(\frac{r}{R})^2$ | CUBIC SPREAD $\frac{27}{4}\left[(\frac{r}{R})^2-(\frac{r}{R})^3\right]$ |
|---|---|---|---|
| PARABOLIC ADJUSTMENT POINT | 7/7 | 1·0 | 0 |
|  | 6/7 | ·73 | ·71 |
| CUBIC ADJUSTMENT POINT | 5/7 | ·51 | 1·0 |
|  | 4/7 | ·33 | ·95 |
|  | 3/7 | ·18 | ·71 |
|  | 2/7 | ·08 | ·39 |
|  | 1/7 | ·02 | ·12 |
| SCREEN CENTRE | 0/7 | 0 | 0 |

FIG. 8

CORRECTION FACTOR SIGNALS FOR CATHODE RAY TUBES

FIELD OF THE INVENTION

This invention relates to a method of generating correction factor signals for a cathode ray tube and particularly, but not exclusively, to the generation of convergence correction signals in a three beam color cathode ray tube.

BACKGROUND OF THE INVENTION

The need to present an undistorted image to the viewer of a cathode ray tube (CRT) presents problems to the designer of the control apparatus. The image is formed by scanning an electron beam over the tube face, a face which may be curved, but does not have the same radius as the apparent radius of the electron beam. In a single beam tube this results in what is known as pin-cushion distortion, a pinching inwards of the scan at the centers of the edges of the image, and an elongation at the corners. Because the gun in a single beam tube is aligned along a central axis of the tube, pin-cushion distortion is symmetrical about a center point of the screen.

Distortion of the image is aggravated in a three beam color tube as, of necessity, the three guns are displaced from each other and each color produces its own displaced pin-cushion raster on the screen. The three beams may, without correction, converge on one spot in the center of the screen but equal horizontal and vertical deflection of the three beams results in a divergence of the beams as well as a displaced pin-cushion effect.

Consequently two distortions have to be corrected before an image is acceptable to a viewer, first the pin-cushion effect and secondly the convergence of the three beams so that they present an aligned image.

Copending U.S. patent application Ser. No. 860,402, filed Dec. 13, 1977 by M. H. Hallett, M. J. Heneghen and B. R. Sowter and assigned to the assignee of this application, describes control apparatus for storing correction factor signals in digital form for a CRT screen divided into a plurality of discrete areas. The correction factor signals are derived for each area by an operator converging first a red and green pattern to give a yellow pattern and then the yellow pattern with a blue pattern to give a white pattern. During each refresh operation of the CRT display, the correction signals thus stored are fetched from memory in synchronism with the movement of the CRT beam to the respective areas of the CRT screen, converted to analog currents and applied to convergence coils of the CRT. In the embodiment described in said copending application there are sixty four discrete areas of the screen and the correction factor signals are derived by the operator as above described from each area separately. This can be a long and tedious process.

SUMMARY OF THE INVENTION

It is an object of the present invention to provide a method for generating correction factor signals that is simpler and shorter for an operator to use.

According to the invention there is provided a method of generating correction factor signals for a cathode ray tube comprising the steps of dividing the screen of the cathode ray tube into a predetermined number of areas, displaying a test pattern at a number, less than said predetermined number, of selected points on the screen, deriving values for correction factor signals at the points where the test pattern is displayed and using the derived values to determine values for correction factor signals for all the areas of the screen.

BRIEF DESCRIPTION OF THE DRAWINGS

In order that the invention may be fully understood a preferred embodiment will now be described and illustrated with reference to the accompanying drawings in which:

FIGS. 6A, B, C and D illustrate steps in the method of FIG. 5;

DETAILED DESCRIPTION

Figure 1:
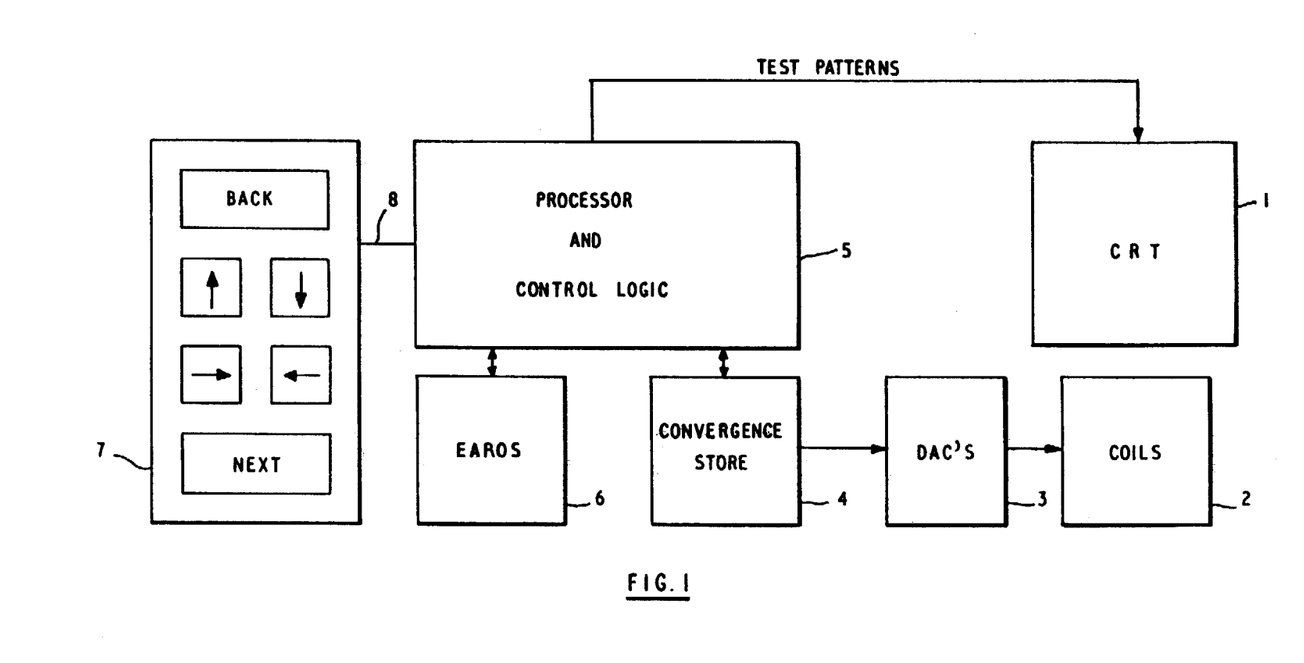
FIG. 1 is a schematic diagram of CRR display control apparatus used in the preferred embodiment.

Referring now to FIG. 1, there is shown, in block schematic form, apparatus suitable for performing the preferred method of the invention. The apparatus comprises a three color gun cathode ray tube (CRT) 1 which, as well as its normal control coils and apparatus, has a set of secondary deflection coils 2 used for controlling the deflection of the electron beams from each of the three red, green and blue guns, and a lateral deflection coil. Color CRT apparatus of the described kind is well known, and therefore is not illustrated in detail. The function of such secondary, or convergence, coils in a color CRT is described, for example, in the text "Colour Television Theory" by G. H. Hutson, published by McGraw-Hill, London, particularly Chapters 6 and 7.

A set of digital to analog converters (DAC's) 3 convert digital correction value signals stored in a convergence store 4 into analog values for application to the deflection coils 2.

The read-out and read-in of the convergence store 4 synchronously with the main raster scan of the CRT is controlled by a processor and control logic block 5, which may contain a microprocessor logic unit having the required microprogram stored in a read only store 6.

The apparatus represented by blocks 1-6 are contained in a single housing which may also include a keyboard, a portion of which is represented by block 7. The keys shown on block 7 are used in the preferred method to enter information into the processor and convergence store; at other times the keys may represent different functions. Of course the keyboard need not be formed integrally with the CRT housing but may be a separate unit connected via a cable 8 and it is also contemplated that the processor block 5 together with stores 4 and 6 may be contained in a separate housing.

The read only store 6 contains the microprogram for controlling the general operations of the apparatus and also any special purpose programs for performing such tasks as diagnostic routines, one of which is a microprogram for controlling the processor to perform the method of the present invention.

In general terms the method of the present invention enables a user of a CRT display to set up a correctly converged screen by using the value of correction factor signals obtained at a predetermined number of areas of the screen to determine the value of correction factor signals required for correct convergence at all other areas of the screen. In the preferred embodiment the screen is divided into 256 areas (16×16 matrix) and correction factor signals are found for 13 areas which are used to determine the values of correction factor signals for the remaining 243 areas.

In a high density definition CRT display the complete screen is not necessarily used for the display of graphic or alphanumeric data as in domestic television sets. For example, in a color tube with a 14 inch visual diagonal a 9.7 inch×7 inch area of the screen is used as the display area using approximately 90% of the shadow mask area.

Figure 2:
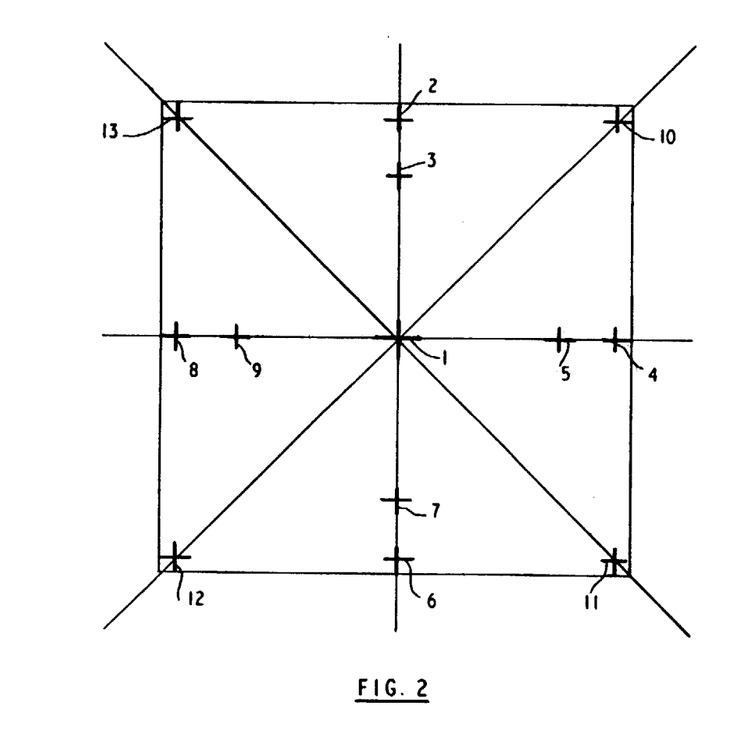
FIG. 2 is a schematic representation of a CRT screen.
Figure 7:
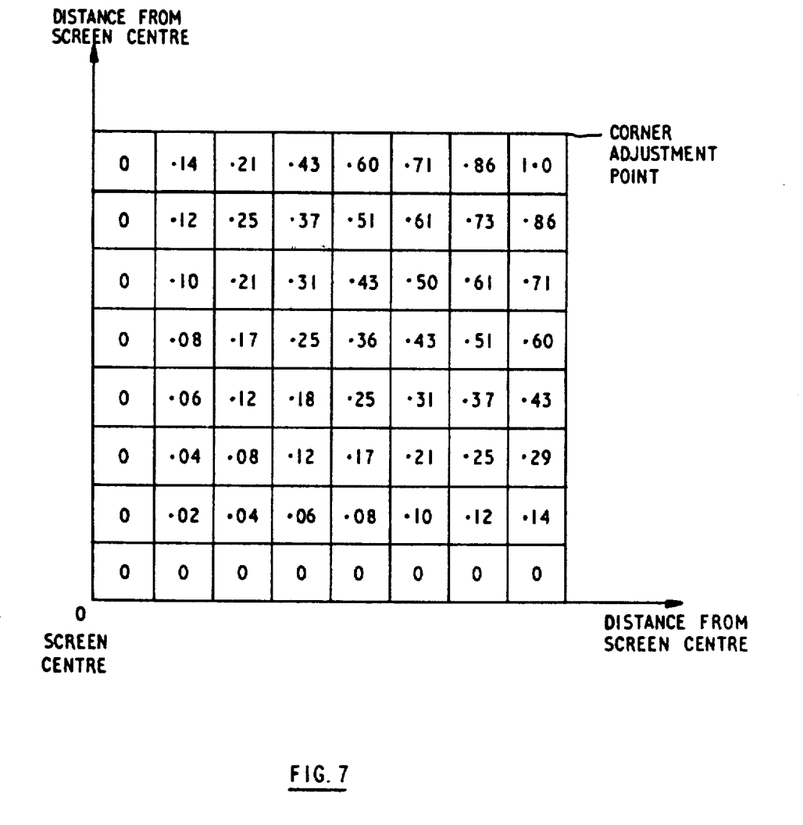
FIG. 7 shows the values in a spread table for corner adjustment steps.

FIG. 2 illustrates the usable area of a screen, which is divided into 16 horizontal zones and 16 vertical zones giving 256 discrete areas. The zone boundaries are not visable as such on the screen. FIG. 7 shows an example of such zone configuration for the upper right quadrant of the screen.

The preferred method of determining the correction factor signals for the CRT is to display successively, at thirteen points, a test pattern which is converged for red and green to give yellow then for yellow and blue to give white. The points chosen are shown in FIG. 2 as:

| | |
|---|---|
| 1 | the center of the screen |
| 2, 4, 6 and 8 | the ends of the four axes |
| 3, 5, 7 and 9 | two thirds of the distance from the center to the end of each axis |
| 10, 11, 12 and 13 | the four corner positions |

The points chosen for display may cover more than one area, depending upon the size and type of test pattern used, for example the center display 1 will cover at least four areas and probably twenty-four.

The correction at the screen center 1 is to allow for static misalignment of the CRT guns and d.c. offset in the convergence amplifiers. The correction factor signals for any coil (red, green, blue and lateral) derived from adjusting the test pattern at the center of the screen 1 is added equally to each digital correction word stored in the convergence store 4 for that coil. This gives rise to a static shift of the complete raster of a given color. The static correction factor signals are derived before values for the other points are found.

In the following, the areas of the screen are defined by row and column, with the origin at the upper left corner of the screen. For example, the area at corner point 10 is bounded by vertical coordinates 15-16 and horizontal coordinates 0-1, and the address of corner point 11 defined in this manner is 15-16 vertical and 15-16 horizontal.

The correction factor signals derived at points 2, 4, 6 and 8 are spread along the horizontal and vertical areas parabolically decreasing to zero towards the screen center point 1. For example, if for point 4 a correction factor signal having a value 37 was needed for the vertical zone 15-16, (i.e. the column of areas at the right margin of the screen) then the values 28, 21, 14, 9, 5, 2, 0 would be added to vertical zones 14-15, 13-14, 12-13, 11-12, 10-11, 9-10, 8-9, vertical zone 8-9 being the column of areas along the right side of the vertical axis of the screen. These values are given only by way of example.

The correction factor signals derived at points 3, 5, 7 and 9 are spread using a cubic expression along the vertical and horizontal zone, so that the spread is towards 0 at the end of the axis and at the center of the screen. If a value of 7 was derived for the point 5 then the spread over the eight vertical zones might be, starting at the center, 0, 2, 4, 6, 7, 5, 0.

The corner points 10, 11, 12 and 13 are converged when the screen center point 1 the outer axis points 2, 4, 6 and 8 and the axis cubic term points, 3, 5, 7 and 9 have been converged. The correction values generated when point 10, for example, is adjusted are spread linearly decreasing to zero along the horizontal zones towards the horizontal axis, linearly decreasing to zero along the vertical zones towards the vertical axis and parabolically decreasing to zero along the diagonal towards the screen center in the Upper Right quadrant of the screen. This is better described by the equation:

$$Ir = I(x/X \times y/Y)$$

Where I is the value of the corner element (X, Y) and Ir is the value used at a point x, y.

For example, if a correction value of 8 is applied to a point 10 in a 16×16 zone system the values applied to the areas in the quadrant would be as in the following table.

TABLE I

| | | | | | | | CORNER |
|---|---|---|---|---|---|---|---|
| 0 | 1 | 2 | 3 | 5 | 6 | 7 | 8 |
| 0 | 1 | 2 | 3 | 4 | 5 | 6 | 7 |
| 0 | 1 | 2 | 2 | 3 | 4 | 5 | 6 |
| 0 | 1 | 2 | 2 | 3 | 3 | 4 | 5 |
| 0 | 0 | 1 | 1 | 2 | 2 | 3 | 3 |
| 0 | 0 | 1 | 1 | 2 | 2 | 2 | 2 |
| 0 | 0 | 0 | 0 | 1 | 1 | 1 | 1 |
| 0 | 0 | 0 | 0 | 0 | 0 | 0 | 0 |
| SCREEN CENTER | | | | | | | |

Figure 3A:
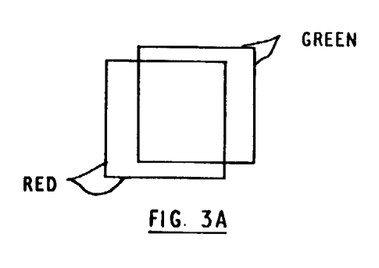
FIGS. 3A, B and C illustrate test patterns used in the preferred embodiment.

FIGS. 3A, B and C illustrate one type of test pattern that can be used with the method of the invention. The control program for generating the test pattern is stored in the electronically alterable read only store (EAROS) 6 of FIG. 1 and the processor and control logic box 5 performs the necessary functions to generate the patterns at the required points on the screen.

Figure 3B:
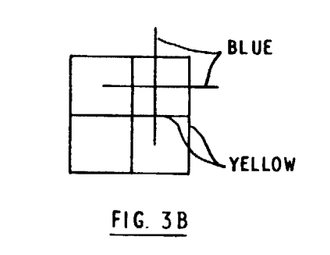
Figure 3C:
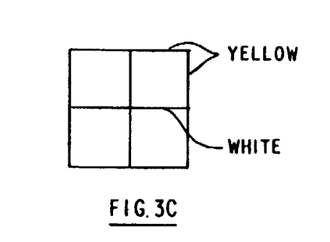

The test pattern shown in FIG. 3A shows a red square and a green square which when converged gives a yellow square shown in FIG. 3B. The second pattern of FIG. 3B then has the converged yellow square together with a yellow center cross and a blue cross. The convergence of the blue and yellow crosses gives the pattern of FIG. 3C, a white center cross in a yellow square. Of course, many other test patterns may be used and those shown in FIGS. 3A, 3B, and 3C are only one example.

When a test pattern such as that of FIG. 3A is displayed at a point on the screen, the processor and control logic also generates a caption for display on the screen, ADJUST RED, and when the pattern of FIG. 3B is displayed, a caption ADJUST BLUE is generated.

The processor can arrange to display the caption at any convenient part of the screen, it may be along a bottom line in a particular color, or in close proximity to the displayed pattern.

Figure 4:
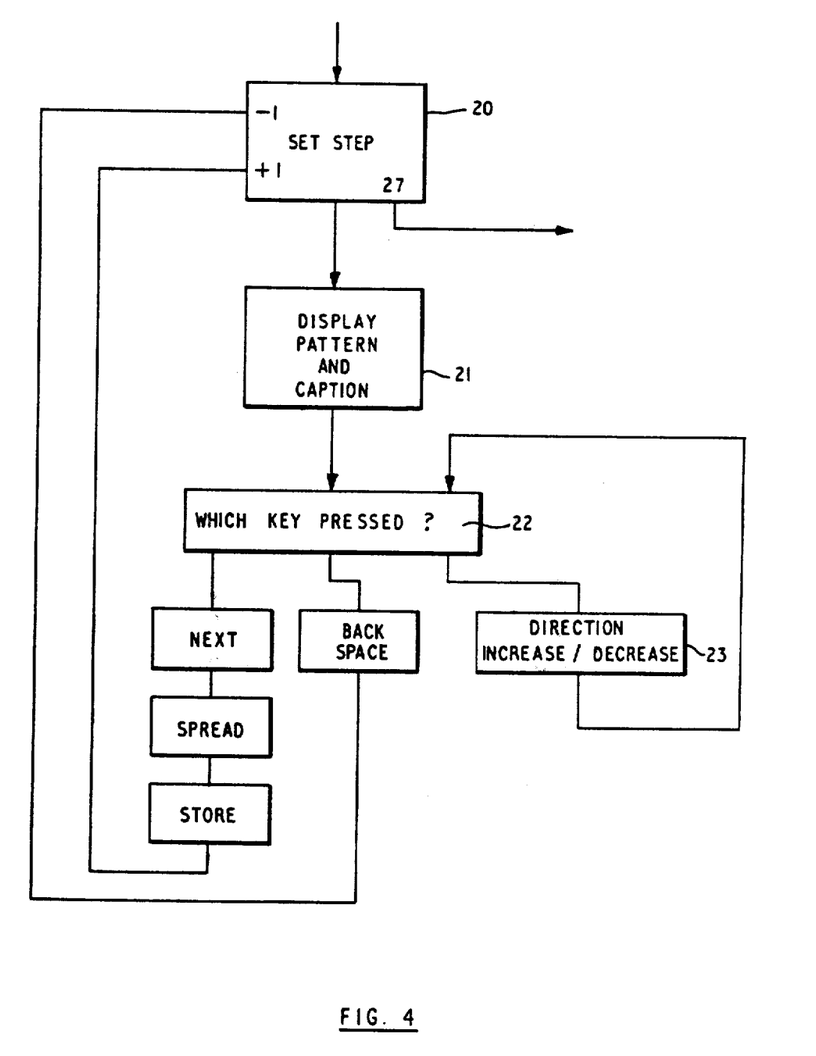
FIG. 4 is a flow chart setting out the steps of the preferred embodiment.

FIG. 4 shows a first level flow diagram of a preferred method of performing the invention. The method consists of twenty-seven major steps which are set in box 20. There are two major steps for each display point on the screen. The first is to display the red and green pattern exemplified in FIG. 3A and display the captioned ADJUST RED and the second is to display the yellow and blue pattern exemplified in FIG. 3B and display the caption ADJUST BLUE.

The display pattern and caption of each major step is illustrated as box 21 of FIG. 4.

Table II below shows the twenty-seven major steps:

TABLE II

| STEP | SCREEN POINT | GUNS ON | CAPTION |
|---|---|---|---|
| 1 | 1 | Red + Green | ADJUST RED |
| 2 | 1 | R + G + Blue | ADJUST BLUE |
| 3 | 2 | R + G | ADJUST RED |
| 4 | 2 | R + G + B | ADJUST BLUE |
| . | . | . | . |
| . | . | . | . |
| . | . | . | . |
| 26 | 13 | R + G + B | ADJUST BLUE |
| 27 | 1-13 | R + G + B | FINISHED |

Each of the major steps includes the following routine of minor steps. When the test pattern is displayed the operator has the opportunity to press one of the keys of the keyboard 7 of FIG. 1.

At the step represented in FIG. 4 by box 22, the processor 5 determines which of the keys is pressed. If the major step is an ADJUST RED step then the pressing of each of the direction keys will result in the following increments or decrements of the appropriate Red and Green digital correction factor signal words stored in the convergence store.

| KEY | RED | GREEN |
|---|---|---|
| → | +1 | +1 |
| ← | −1 | −1 |
| ↑ | +1 | −1 |
| ↓ | −1 | +1 |

When the major step is an ADJUST BLUE step then the digital correction factor signal words for the Blue and Lateral coils are incremented or decremented as follows:

| KEY | BLUE | LATERAL |
|---|---|---|
| → |  | +1 |
| ← |  | −1 |
| ↑ | −1 |  |
| ↓ | +1 |  |

The other two keys on the keyboard 7 are labelled NEXT and BACK. In response to the pressing of the NEXT key the processor steps from one major step on to the next major step, in response to the pressing of the BACK key the processor steps backwards from one major step to the previous major step. This may be necessary when an operator assesses that the correction at one point may have had an adverse effect upon a previous converged area, or simply wishes to check a previously converged point.

The direction keys may be pressed in a 'typomatic' mode, that is the key is held down for more than one cycle of addition or subtraction to the correction factor signal word until the operator judges that sufficient correction in that direction has been made. Of course if as a result an overshoot occurs then the reverse direction key is pressed.

The block 23 in the flow chart of FIG. 4 indicates that when the processor has determined a direction key has been pressed it performs the necessary increase or decrease in the appropriate correction factor signal word for each cycle that the key is pressed. The method is, of course, interactive, that is, for each update of a correction factor word so the image formed on the screen by the associated gun will change position and the operator sees directly the result of pressing a direction key. Insofar as this operation is concerned, the apparatus and procedure are similar to that shown and described in the aforecited U.S. patent application Ser. No. 860,402. That is, the convergence coils provide for a diagonal red shift, an oppositely sloped diagonal green shift, a vertical blue shift and a lateral blue shift for registration of the three colors. As in that prior application, these shifts can be effected by operation of counter means which are incremented or decremented as the keys are operated to move corresponding color subpatterns into registration, the values thus derived being recorded to be fetched in synchronization with the CRT scan operation and fed through the digital to analog converters 3 to coils 2.

However, in this case they are also available to processor 5 as the basis for spreading operations in accordance with the present invention. When the operator presses the NEXT key, before the processor proceeds to the next step it performs the calculation necessary to spread the value arrived at for the point just converged to the areas affected by that point.

The spreading in the preferred embodiment is as follows:

| | |
|---|---|
| Steps 1 and 2 | The spreading is uniform throughout the screen. |
| Display point 1 | This is because the center point adjustment corrects for static misalignment and consequently if a correction factor of say 5 is required for the red green at the center point then 5 is added to all the correction factor words for that gun. |

For the steps 3-26 the spreading for each point will affect only one or two of the quadrants of the screen. The convention used to refer to the quadrants is to call the Upper Right quadrant 1, the Lower Right quadrant 2, the Lower Left 3 and the Upper Left 4. Three special spreading algorithms are used (1) an Axes Parabolic (AP). That is the correction is spread uniformly along each of the zones transverse the axis on which the converged point lies parabolically decreasing to zero towards the transverse axis.

(2) An Axes Cubic (AC). That is the correction is spread uniformly along each of the zones transverse the axis in which the converged point lies using a cubic expression $$E = 27/4[(r/R)^2 - (r/R)^3]$$

wherein E is the error (correction factor), r is the distance from the center point to the measured point 3, 5, 7, or 9, and R is the distance from the center to the point to the screen edge.

The correction factor decreases cubically to zero at the transverse axis and the screen edge.

(3) A Corner Spread (C). This spreading is calculated as described above with reference to Table I.

| | |
|---|---|
| Steps 3 and 4<br>Display point 2 | The AP spread is used and affects quadrants 1 and 4 |
| Steps 5 and 6<br>Display point 3 | The AC spread is used and affects quadrants 1 and 4 |
| Steps 7 and 8<br>Display point 4 | The AP spread is used and affects quadrants 1 and 2 |
| Steps 9 and 10<br>Display point 5 | The AC spread is used and affects quadrants 1 and 2 |
| Steps 11 and 12<br>Display point 6 | The AP spread is used and affects quadrants 2 and 3 |
| Steps 13 and 14<br>Display point 7 | The AC spread is used and affects quadrants 2 and 3 |
| Steps 15 and 16<br>Display point 8 | The AP spread is used and affects quadrants 3 and 4 |
| Steps 17 and 18<br>Display point 9 | The AC spread is used and affects quadrants 3 and 4 |
| Steps 19 and 20<br>Display point 10 | The Corner spread is used and affects only quadrant 1 |
| Steps 21 and 22<br>Display point 11 | The Corner spread is used and affects only quadrant 2 |
| Steps 23 and 24<br>Display point 12 | The Corner spread is used and affects only quadrant 3 |
| Steps 25 and 26<br>Display point 13 | The Corner spread is used and affects only quadrant 4 |
| Step 27 | This is used for checking only, no adjustment is made. |

When the processor has performed the instructions necessary to spread the correction factor to all areas affected at the current step then the next major step is entered. At the start of each major step the pattern displayed will be affected by the convergence factor signals generated by the previous steps, thus at step 4 5 the display pattern will be affected by correction factor signals derived in steps 1 and 3 for the red and green guns.

When major step 27 is entered display patterns are generated for all thirteen display points and a caption FINISHED displayed. If the operator is satisfied with the result the NEXT key is pressed and the values of the correction factor signals are stored in the EAROS store 6. It is not necessary to store the values for all areas in the EAROS store, so with only the values for the thirteen display points, the values for the other areas of the screen can be calculated by the processor whenever the display is in use.

Figure 5:
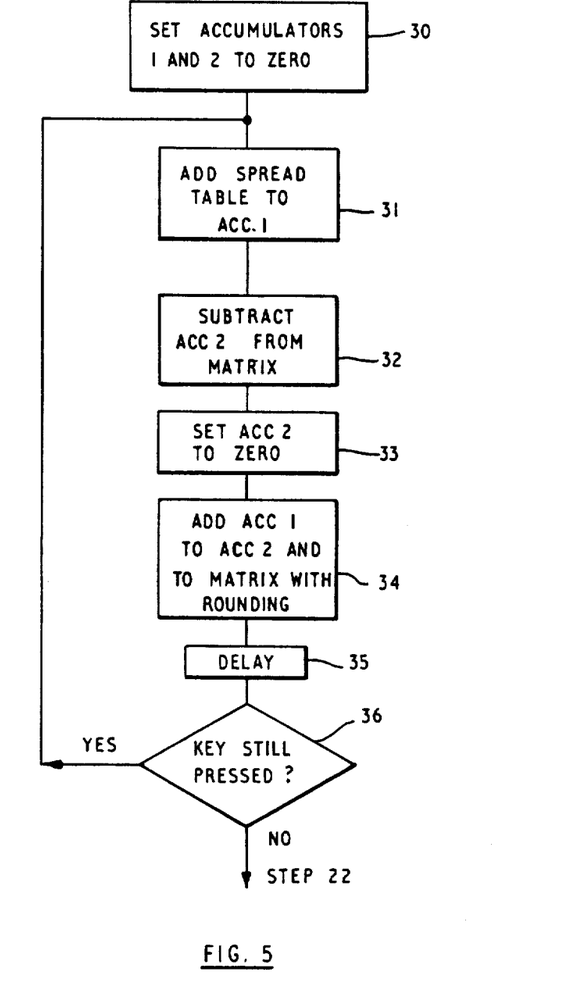
FIG. 5 illustrates an alternate method to that shown in FIG. 4.
Figure 6:
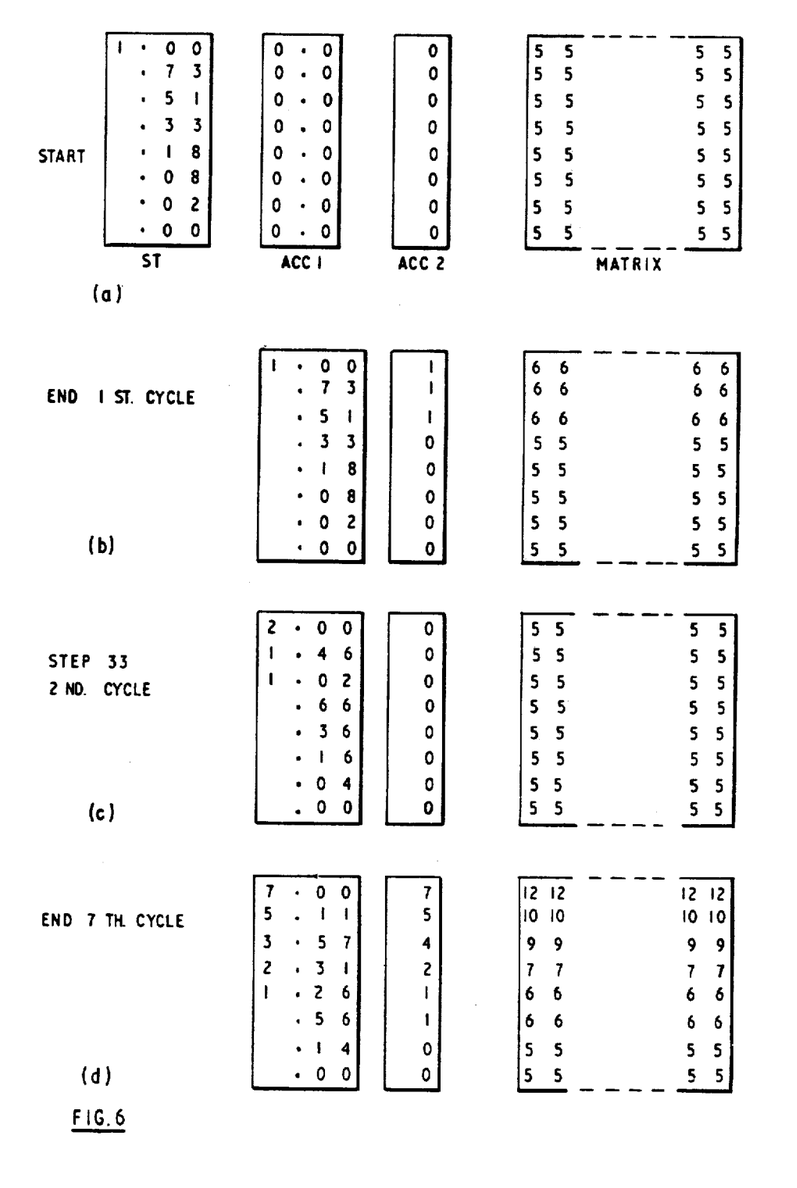

An alternative method of spreading the correction factor values is illustrated in FIGS. 5 and 6.

In the FIG. 4 embodiment the spreading of the correction factor values only occurs after the NEXT key is pressed. The FIG. 5 alternative is to spread the correction factor values at step 23 of FIG. 4. FIG. 5 illustrates the alternative step 23, and is described with reference to FIG. 6 in which the spread at major step 3 for the red gun at the top half of the screen in a 16×16 matrix of screen areas is illustrated.

The values of the spread for each cycle of key depression are stored in a spread table (ST) in FIG. 6(a), two accumulators ACC1 and ACC2 are used and the correction factor values are stored in the correction value matrix which contains one entry for each area in the quadrant.

The first step 30 of FIG. 5 sets the accumulators ACC1 and ACC2 to zero, this is shown in FIG. 6(a). FIG. 6(a) also shows the correction factor matrix with a value of 5 for each area. This is assumed to be the value entered into the matrix as a result of major step 1 when the center display pattern was adjusted and the resultant correction factor spread to all areas. Of course the number 5 is used in FIG. 6 by way of example only and may, depending upon the system used, be any number. For this example it is also assumed that the operator is pressing the → key on keyboard 7 which requires a +1 for each cycle for the red correction factor signal value.

Step 31 follows step 30 requires that the contents of the spread table (ST) are added to the contents of ACC1.

Step 32 then subtracts the contents of ACC2 from the contents of each row of the correction factor matrix. In the first cycle of key depression this will be a zero subtraction and obviously not affect the contents of the matrix.

Step 33 sets the ACC2 to zero.

Step 34 adds the contents of ACC1 and ACC2 and the matrix with a rounding up or down of the decimal point to maintain whole numbers in both ACC2 and the matrix.

Step 35 introduces a small delay into the process to enable the CRT to react to the changed values in the correction factor matrix and to display the display pattern with the adjustment.

FIG. 6(b) illustrates the contents of ACC1, ACC2 and the matrix at the end of the first cycle.

Step 36 is a decision step to determine whether the operator still has the → key depressed. If so step 31 is re-entered, if not then step 22 of FIG. 4 is performed.

FIG. 6(c) illustrates the contents of ACC1, ACC2 and the matrix at the end of step 33 on the second time round. ACC1 contains the spread table numbers times two—unrounded, ACC2 contains all zeros and the matrix has the same contents as it had at the start of the major step. The process can be synchronized with the scan system of the display so that steps 32, 33 and 34 take place during a flyback period thus avoiding jitter of the test pattern due to relatively large changes in the correction matrix which could occur during these steps. Of course, after step 34 the ACC2 and Matrix will have contents that reflect the values in ACC1. This is illustrated in FIG. 6(d) which shows the contents of ACC1, ACC2 and the matrix at the end of the seventh cycle. Because ACC2 is returned to zero during each cycle rounding errors are not compounded and the rounding only takes place on the actual values contained in ACC1.

If in the example of FIG. 6 after the seventh cycle the operator releases the key, then the processor steps on to step 22 of FIG. 4. The operator may again press the same key in which case the routine of FIG. 5 is entered again or it may be a key that requires subtraction rather than addition of the spread table to the matrix. In this case the routine of FIG. 5 will be altered to change the add steps to subtract and the subtract to add.

If the key pressed is the NEXT then the values in the matrix are stored in the convergence store ready for the next major step when the values for a red gun is again adjusted.

If the → key is pressed a similar add routine is performed concurrently for the green gun correction factor matrix and if either the ↑ or ↓ keys are pressed then while one matrix is being added to, the other is having values subtracted.

After the NEXT step the spread step of FIG. 4 is omitted as this has already been performed by the FIG. 5 routine.

If the major step concerns the adjustment of one of the corner points then the spread table will contain an array of values, one for each of the areas in the quadrant and ACC1 and ACC2 will have a similar number of positions so that the complete array is transferred from the spread table to the matrix via ACC1 and ACC2, otherwise the routine is the same as that shown in FIG. 5.

FIG. 7 shows the actual values in the spread table for a corner adjustment when the adjustment values are calculated as described above with the equation $$Ir = I(x/X) \times (y/Y)$$

Figure 8:
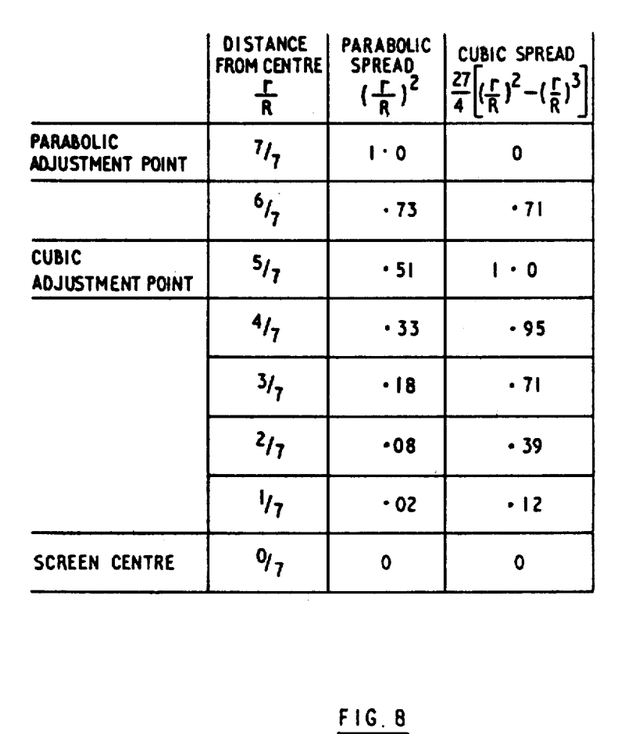
FIG. 8 shows the values for the axis spreads for both parabolic and cubic adjustment steps.

FIG. 8 shows the values for the axis spreads both parabolic and cubic.

In summary, the general method of the invention is to accumulate the results of test procedures according to a curve fitting algorithm which takes account of the geometry of the CRT gun structure, the electron optics including particularly the convergence factors, and the geometry of the CRT as a whole, including the location and curvature of the CRT screen with respect to the guns. As above described, it has been found that a very good fit can be achieved between actual convergence requirements at any point on the screen and the calculated convergence requirements derived from actual measurements at only a few strategically chosen points. In the embodiments illustrated and described, the number of points or areas chosen for control of the convergence system is two hundred fifty-six and the number of measured points is thirteen. The two hundred sixty-four areas could be more or fewer but are considered to provide sufficient fineness of convergence control for most applications. The thirteen measured points could also be more or fewer but are sufficient for the information utilized, by curve fitting, to determine the desired convergence adjustments for the entirety of the screen area to be utilized.

In the preferred embodiments, the thirteen measurements identified in FIG. 2 yield: a basic measurement for the whole screen, performed at screen center point 1; parabolic amplitude measurements at the screen edge points 2, 4, 6, 8 and screen corner points 10, 11, 12, 13; and cubic deviation or perturbation measurements taken at intermediate points 3, 5, 7, 9.

The spreading procedures described give a precise convergence factor signal at the actual converged points. However, there is an increasing possibility of error for the areas furthest away from these actual converged points. This is particularly true of the corner areas 10, 11, 12 and 13 when the previous nine areas have been successfully adjusted. The convergence of the corner areas when provides a further fine adjustment of the correction factor signals for the whole of the associated quadrant of the screen as is shown in FIG. 7. It will be seen that a precise convergence value, for each of the four convergence coils can be derived for any point or zone on the screen.

The above description illustrates preferred embodiments of the invention. There are other ways of implementing the spreading of the correction factor values, for example, the number of display points may be varied and the number of areas of the screen increased or decreased depending upon the degree of accuracy required for each particular application.

Having thus described my invention, what I claim as new, and desire to secure by Letters Patent is:

1. In cathode ray tube apparatus in which the screen is notionally divided into a plurality of areas and which includes storage means arranged in operation to contain correction factor signals for each area of the screen, the method of generating correction factor signals comprising the steps of displaying test patterns at a number of points of the screen less than the number of said areas, adjusting the displayed test patterns to remove distortions thereof, deriving correction factor signals for the points at which the test patterns are displayed in accordance with the adjustments effected, and using the derived correction factor signals to determine correction factor signals for each area of the screen.

2. A cathode ray tube display system for performing the method of claim 1,
including a keyboard, a processor, storage means and control logic means arranged to accept operator entries at said keyboard for registering said derived signal values and to generate said determined signal values according to an interpolating algorithm.

3. The method of claim 1, including the steps of displaying the test patterns for different points sequentially, the adjustment of a display test pattern, determining correction factor signals for at least some areas of the screen, and accumulating for every area of the screen the correction factor signals thus determined, whereby for each area of the screen final correction factor signals are obtained which are the sums of the correction factor signals determined by the adjustment of the individual test pattern.

4. A method as claimed in claim 3 including the steps of displaying a test pattern at the center of the screen, deriving a correction factor value for that area and adding the derived correction factor value to the correction factor values for all other areas of the screen.

5. A method as claimed in claim 3 including the step of storing the derived correction factor signals in a digital store.

6. A method as claimed in claim 5 in which said digital store stores digital correction factor values associated with each of said plurality of areas.

7. The method of claim 1 or 3, wherein the cathode ray tube is a multi-gun color tube, and wherein for each area of the screen a plurality of correction factor signals are determined.

8. A method as claimed in claim 7, wherein
the step of displaying a test pattern at a selected point is a major step and includes the steps of deriving correction factor signal values for each of three color guns and a lateral correction coil.

9. A method as claimed in claim 8 in which the correction factor signal values derived before a major step is entered are retained in the digital store until that major step is completed.

10. A method as claimed in claim 9 in which an operator may determine to move either forward to a next major step or back to a previously completed major step.

11. A method as claimed in claim 7 in which
said points comprise screen axis end points, points intermediate of said end points and the center of the screen, and screen corner points, and the method of determining said correction factor signals for said associated areas comprises spreading the derived correction values for said points.

12. A method as claimed in claim 11, wherein
the derived correction factor values for the axis end points are utilized to define a parabolic distribution of determined correction factor values decreasing from the respective end point toward the screen center,
the derived values for said intermediate points are utilized to define a cubic distribution of determined correction factor values decreasing from the respective intermediate point both toward the respective axis end point and said center, and
the derived values for said corner points are utilized to define determined correction factor values decreasing linearly toward the adjacent axis end points and parabolicly toward said center,
the several correction factors being combined to yield said final correction values for said associated areas of said screen.

13. The method of claim 7, wherein the correction factor signals define respective deflection corrections to be applied to the red, blue, green and blue lateral convergence coils.

14. In cathode ray tube apparatus comprising a screen which in the operation of the apparatus is notionally divided into a plurality of areas, and storage means arranged in operation to contain correction factor signals for each area of the screen, the improvement which comprises means for generating test patterns for a number of points of the screen less than the number of said areas, means for adjusting the test patterns to remove distortions thereof, means for deriving correction factor signals for said points and generating correction signals from said derived signals for all said areas, said last named means comprising means for accumulating for every area of the screen the correction factor signals thus determined, whereby for each area of the screen final correction factor signals are obtained which are the sums of the correction factor signals determined by the adjustment of the individual test pattern, and means for recording said sums in said storage means.

* * * * *